United States Patent [19]

Noble et al.

[11] Patent Number: 4,994,670
[45] Date of Patent: Feb. 19, 1991

[54] DITHER SCANNED IR IMAGING SYSTEM HAVING A WIDE FIELD OF VIEW

[75] Inventors: Milton L. Noble, Liverpool; Albert F. Milton, Syracuse, both of N.Y.

[73] Assignee: General Electric Company, Syracuse, N.Y.

[21] Appl. No.: 447,912

[22] Filed: Dec. 7, 1989

[51] Int. Cl.⁵ .............................................. H01J 3/14
[52] U.S. Cl. .................................... 250/235; 250/334
[58] Field of Search .............. 250/234, 235, 236, 330, 250/332, 334, 227.20; 350/6.2, 6.4

[56] References Cited

U.S. PATENT DOCUMENTS 4,837,431  6/1989  Malinowski et al. ............... 250/235
4,910,401  3/1990  Woods ................................ 250/334

Primary Examiner—David C. Nelms
Attorney, Agent, or Firm—Richard V. Lang; Paul Checkovich; Fred Jacob

[57] ABSTRACT

A dither scanned IR imaging system is disclosed for achieving panoramic coverage. For complete 360° azimuth coverate, the field of view is divided into eight sectors, each imaged by a separate objective lens upon a loose packed 2D photodetector array. The photodetectors are tight packed in the array columns while the columns are loose packed, being on centers spaced by integral numbers of photodetector dimensions (i.e., pixels). The image is dithered the distance between columns over the array by a pair of counter rotating IR refractive discs of wedge shaped cross section. A full-frame partial-sample of the image is taken each time the image advances one pixel until the image has been fully sampled. Tight packed arrays may also be employed if additional means are provided to partially sample the image. In achieving 360° panoramic coverage, the imaging system provides a major improvement in performance over systems using a single linear array and avoids large mirror movements or large gimbal movements. An approach for employing a conventional tightly packed two dimensional photodetector array in a dither scanned imaging system is also disclosed which uses fiber optics to transform the image plane to the required loosely packed partially sampled configuration. Used in this manner the area array covers a wide field of view with many more pixels of resolution than the number of photodetectors provided in the array.

18 Claims, 4 Drawing Sheets

COVERAGE BY INDIVIDUAL LENSES

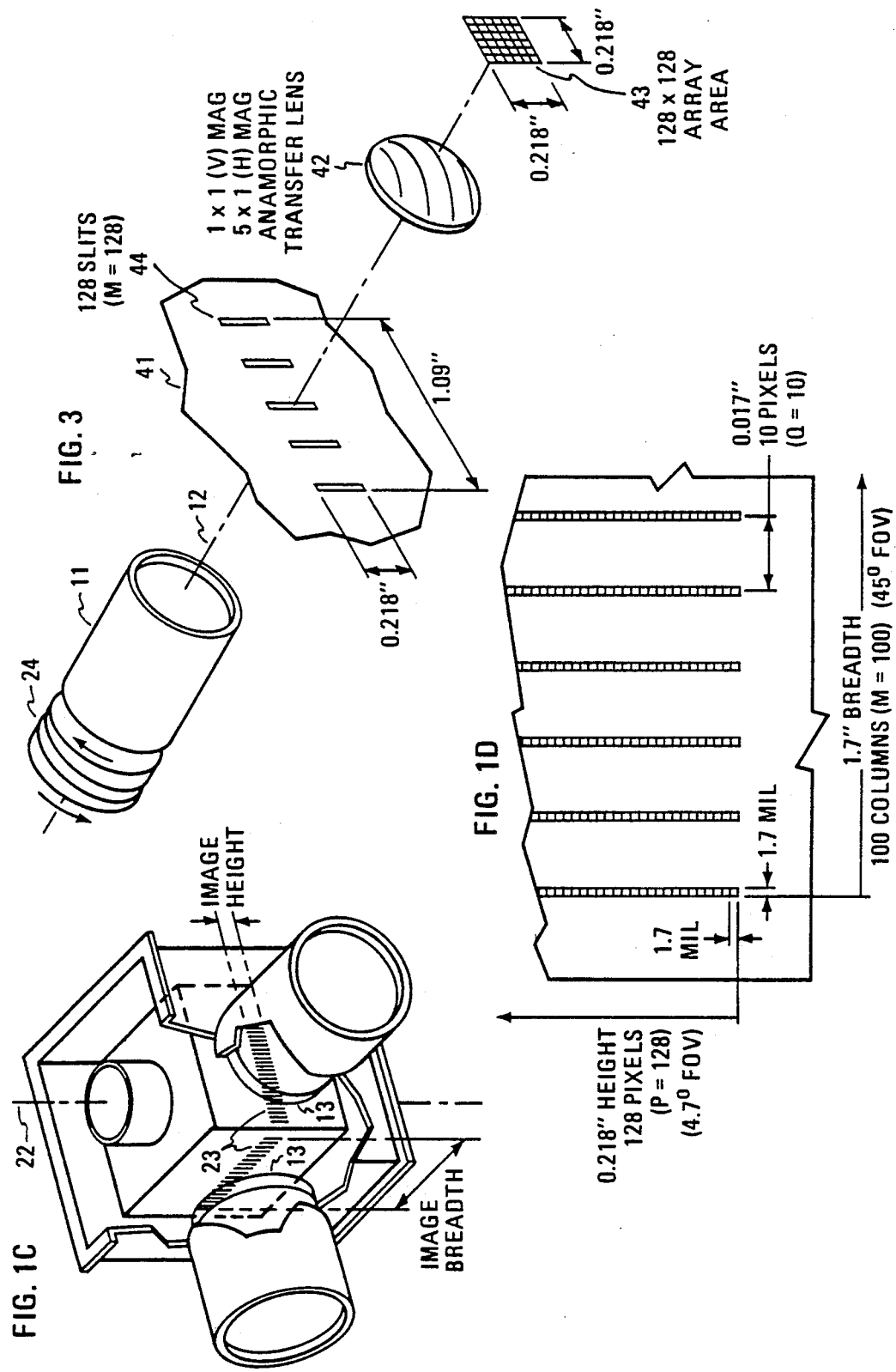

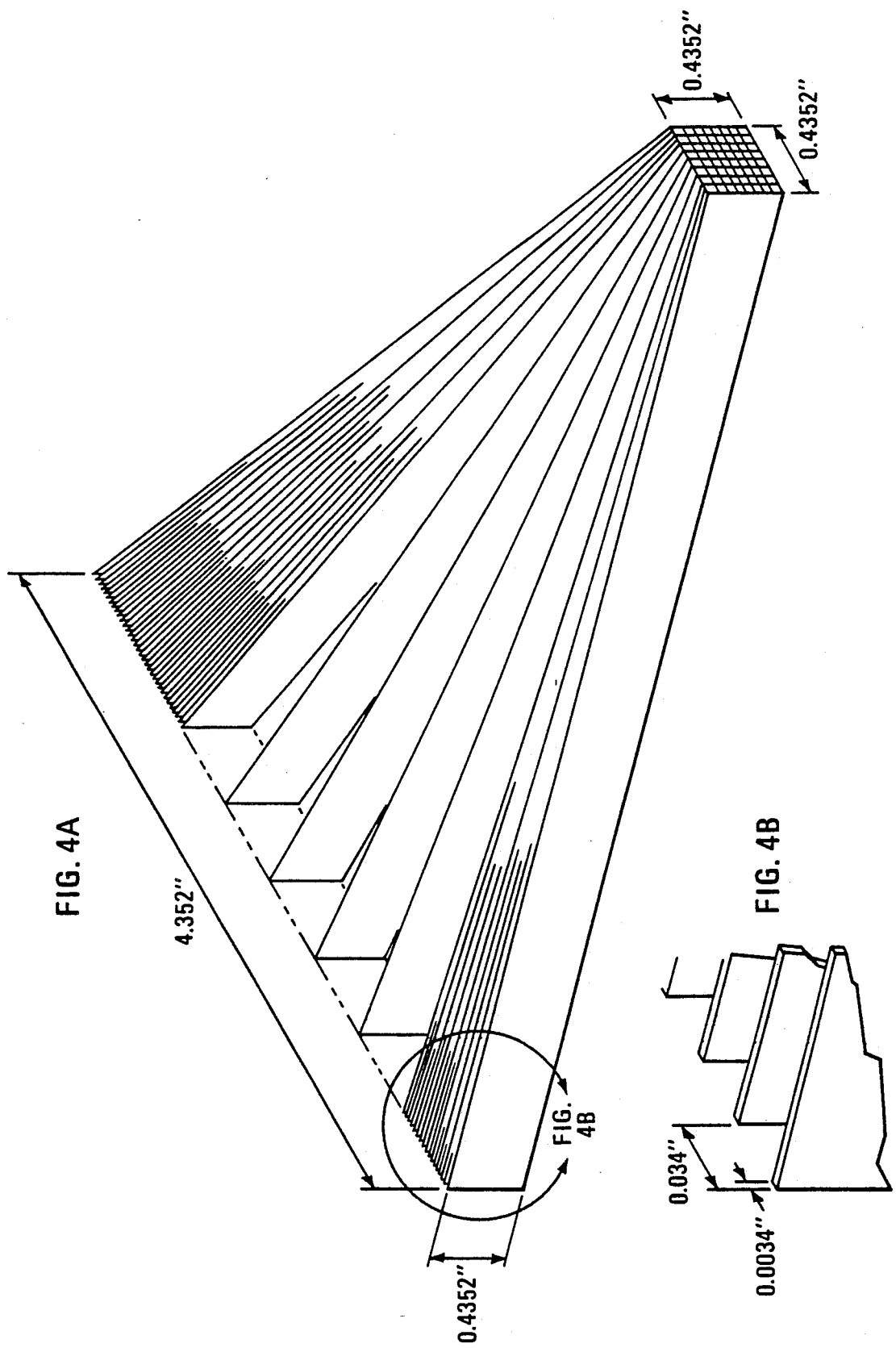

DITHER SCANNED IR IMAGING SYSTEM HAVING A WIDE FIELD OF VIEW

BACKGROUND OF THE INVENTION

1. Field of the Invention

The invention relates to azimuthally scanned IR imagers for achieving coverage of a wide field of view, and more particularly to an IR imaging system which avoids the need for large movements of mirrors or gimbals when large azimuth angle coverage is sought.

2. Prior Art

Panoramic coverage in infrared has customarily been achieved by means of a linear IR array which is ordinarily scanned across a panoramic field of view-frequently 360 deg. in azimuth angle. While the foregoing approach has been reasonably successful, it is clear that greater range capability, greater sensitivity, and more compact packaging would be welcomed. Thus it would appear desirable to increase the integration time, decrease the revisit time while requiring a smaller scanning angle to achieve wide azimuthal coverage.

SUMMARY OF THE INVENTION

Accordingly it is an object of the present invention to provide an improved azimuthally scanned IR imaging system having a wide field of view.

It is another object to provide an azimuthally scanned IR imaging system having a wide field of view in which the scanning angle in azimuth is small in relation to the azimuthal coverage of the imaging system.

It is still another object to provide an azimuthally scanned IR imaging system having a wide field of view having increased photodetector integration time.

It is a further object to provide an azimuthally scanned IR imaging system having a wide field of view having decreased revisit time.

It is a further object to provide an imaging system which uses a conventional tight-packed two-dimensional photodetector array to cover a wide field of view with many more pixels of resolution than the number of photodetectors provided in the array.

It is yet a another object to provide an azimuthally scanned panoramic imaging system having increased photodetector integration time, decreased revisit time, while requiring only a small azimuthal scanning angle to achieve large azimuthal coverage.

These and other objects of the invention are achieved in a novel azimuthally scanned imaging system, typically providing 360° coverage of a panoramic field of view.

In one practical embodiment, the imaging system comprises eight images each with an objective lens, positioned at successive 45° azimuthal angles about a common vertical axis and each forming an image its image plane of an an eighth (e.g. $N^{th}$) sector shaped portion of the predetermined 360° coverage and eight photodetector area arrays, each disposed in the image plane of one of the eight (N) objective lenses. Each array comprises M columns of P photodetectors, the read out of which constitutes a frame. The photodetectors in each column are tightly packed for full spatial sampling of the image of the coverage in height and the M columns are loosely packed for partial spatial sampling of the image of the coverage per frame, the column centers being spaced by the breadth of Q photodetectors.

The imaging system further comprises azimuthal scanning means for sequentially displacing each image in relation to the corresponding array by substantially the breadth of one photodetector, and repeating the displacement $(Q-1)$ times to complete a dithered azimuthal scan for full spatial sampling of the image of the coverage. Means are provided for reading out each array multiple times at each of the Q positions, in the exemplary embodiment to obtain 2Q frames for each completed azimuthal scan.

In accordance with another embodiment of the invention means such as a slitted cold shield plate or a fan shaped fiber optics assembly are employed to provide spaced samples of the image which are coupled to a tight-packed two-dimensional array. As in the first embodiment, the arrangement provides many more pixels of resolution than there are detectors in the array.

The novel arrangement provides P discrete samples of the coverage in elevation angle and $(N \times M \times Q)$ discrete samples of the coverage in azimuth angle while detector integration time may be increased 10 fold, the revisit time may be decreased 10 fold, and the required wide azimuthal scanning angle, reduced by two orders of magnitude from that of a typical linear array in providing 360 degrees of panoramic azimuthal coverage.

BRIEF DESCRIPTION OF THE DRAWINGS

The inventive and distinctive features of the invention are set forth in the claims of the present application. The invention itself, however, together with further objects and advantages thereof may best be understood by reference to the following description and accompanying drawings, in which:

FIGS. 1A, 1B, 1C, and 1D relate to a dither-scanned imaging system in accordance with a first embodiment of the invention: FIG. 1A being a perspective view of an imaging system showing the arrangement of eight objective lenses and eight associated loose-packed arrays for achieving 360° of panoramic azimuth angle coverage; FIG. 1B being an illustration the formation of the 360° panoramic coverage from eight sector shaped contributions by the eight objective lenses; FIG. 1C, being a broken away view of of the imaging system showing the "loose pack" photodetectors arrays in the image planes of two of the objective lenses; and FIG. 1D being a greatly enlarged view of a small portion of the loose packed area array to illustrate the pixel distribution;

FIG. 3 is an illustration of a second embodiment of the invention, in which the loose packed array is replaced by an anamorphic optic and a tight packed area array; and FIGS. 4A and 4B are illustrations of a third embodiment of the invention for use with a tight-packed array in which a fiber optic imaging system is used to replace the anamorphic optic.

DESCRIPTION OF THE PREFERRED EMBODIMENT

A dither scanned panoramic imaging system 10 in accordance with a first embodiment of the invention may best be understood by reference to FIGS. 1A, 1B, 1C and 1D.

Figure 1A:
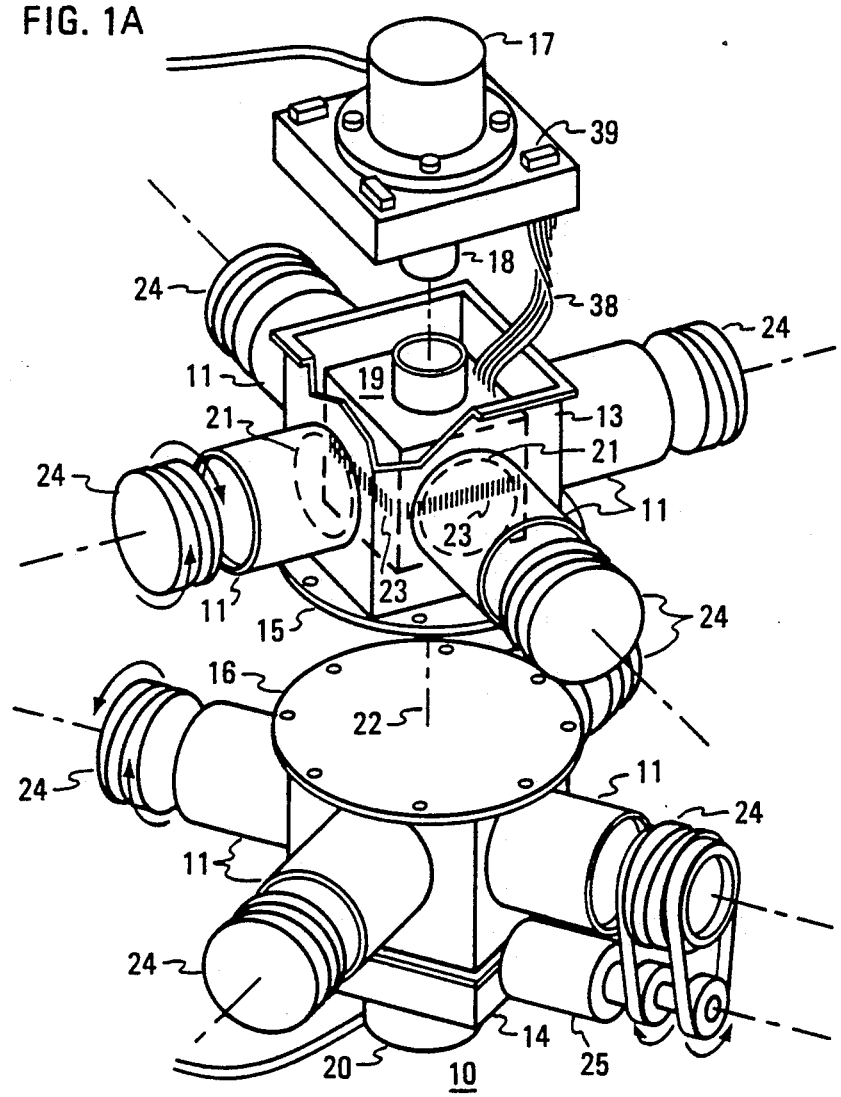

The imaging system, as shown in FIG. 1A, includes eight objective lenses 11, in two sets of four lenses, arranged about a vertical axis 22 at 45° intervals to achieve 360° of azimuth angle coverage. Each of the eight objective lenses forms an image of the object field upon an associated photodetector array 23, which senses the image. Height and breadth in the image planes of the objective lenses correspond to elevation angle and azimuth angle in the panoramic object fields of the lenses.

The term "dither scan" has been employed to denote that the scanning, which in the image plane of the objective lenses is the displacement of the image in relation to each photodetector array to achieve fully sampled azimuthal coverage of the object field, is small. Meanwhile the object field may be a full 360° in azimuth angle. The relative displacement may be measured in mils or in photodetector dimensions i.e. ("pixels") in the image planes or in degrees of azimuth in the panoramic object field. It is appropriately an "azimuthal" scan.

In an imaging system, in accordance with the invention, the eight loose-packed arrays are operated to sample with successive frames; each frame a partial sample of the image as it is azimuthally scanned. Each array consists of "M" photodetector columns, (each column oriented vertically to the breadth-dimension of the image), with each set of columns being loose packed along the breadth dimension to take only a partial sample of the image as each "frame" is read out. For example, as a frame of the M columns of photodetectors is read out, the partial sample may be only one of every 10th pixel of the eventual photodetector distribution over the total breadth dimension of the image.

Read out means are accordingly arranged to take sequential full-frame partial-image samples at each of 10 successive positions of the image, each position displaced from the prior position by a single pixel. The process is repeated until the image has been fully sampled as if by a tight packed array, thereby completing the azimuthal scan. The azimuthal displacement required to complete the scan need only bridge the separation between columns of which there are eight sets of 100 columns in the 360° panoramic view. Measured in the corresponding azimuth angle of the object field, this amounts to less than one-half (i.e. 360/800=0.45) of a degree. The scanning, because of its small magnitude and its periodic nature is thus appropriately termed a "dither scan".

Dither scanning results when a high degree of parallelism is employed in the photodetector arrangement in the azimuthal dimension. This arrangement permits the scanning for full 360° azimuthal coverage to be limited to the azimuthal separation between photodetector columns. Dither scanning may be distinguished from the conventional serial read out in which the full 360° panoramic field of view is swept over a single photodetector column. The conventional arrangement has the disadvantage of requiring a large mirror movement or the scanning of a mechanical gimbal through a large angle to cover this wide field of view. In the process, the conventional arrangement produces less than ideal system performance.

Figure 1B:
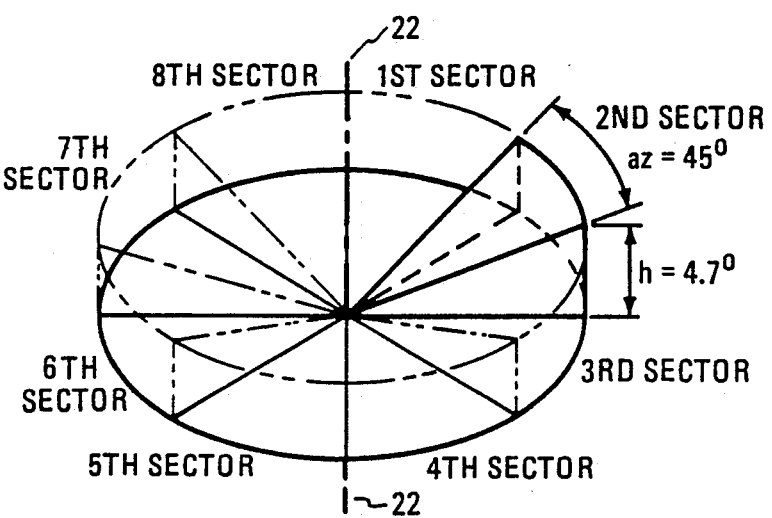

The field of view of the imaging system of the present invention, relative to the axis 22 and its subdivision into the coverage provided by the individual objective lenses 11 is illustrated in FIG. 1B. The object field or target is typically sufficiently distant (i.e. usually measured in miles or large fractions of miles) such that a vertical separation of the two sets of lenses, even if on the order of a few feet rather than a few inches, would have a negligible effect upon the field of view. In addition, the axes of the lenses intersect the central axis 22. Thus, with the axes of the individual lenses extending radially from a common vertical axis 22 and lying in a virtually common horizontal plane, the conditions are appropriate for imaging an encircling panoramic view.

For that purpose, each objective lens is positioned to image an individual sector shaped field of view, similar to that of the other lenses, in order to obtain a composite image of the panoramic view, as shown in FIG. 1B. Assuming eight lenses, each lens is required to provide an ⅛th part of 360° or a relatively modest 45° to the panoramic coverage. Due to the circular symmetry of the objective lenses 11, the potential coverage in elevation angle is also 45° but as shown, only 4.7° (h) is sampled by the photodetector array and subject to use. It should be understood that smaller azimuthal fields of view can be obtained using smaller values of N, with N=1 in the limit.

The elements of the eight lens assembly 10 are aligned to insure that those portions of the images sampled by the photodetector arrays join with a small overlap to avoid gaps and are in proper mutual relationships to the vertical axis and horizontal plane to provide the continuous panoramic view discussed above.

The selection of 360° in azimuth angle coverage is typical, but lesser amounts of azimuthal coverage may be chosen, depending upon application. Changes in elevation angle coverage for different applications, may be accommodated by increases in the length of the photodetector columns in the image planes of the objective lenses.

Returning to FIG. 1A, the first set of four objective lenses are mounted in a position fixed in relation to the four walls of an upper Dewar 13, and the second set of four objective lenses are similiarly mounted in relation to the four walls of a lower Dewar 14. The Dewars 13, 14 are independently cooled and separately connected electrically. They may be either independently mounted or mechanically assembled into a single unit as shown. Assembly is achieved by means of circular covers 15 and 16 placed on the lower surface of Dewar 13 and the upper surface of Dewar 14 (using the orientations of FIG. 1A). The covers 15 and 16 provide flanges extending beyond the four Dewar walls permitting the two Dewars to be assembled by means of screws disposed around the perimeter of the covers. Rectangular covers 28 complete the Dewar enclosures.

The cooling of the Dewars is also shown in FIG. 1A. The upper Dewar 13 is cooled by means of a closed cycle cryo-cooler 17 supported on a cover 28 and acting through a cold finger 18 in good thermal contact with the upper cubic hybrid assembly 19. The lower Dewar 14 is cooled by means of a closed cycle cryo-cooler 20 acting through a cold finger (not shown) in good thermal contact with a lower cubical hybrid assembly (not shown).

The two cubic hybrid assemblies (e.g. 19), are set within the respective Dewars, and are aligned with respect to the optical axis of the imaging system and the four walls of the Dewar to which the objective lenses are referenced. More particularly, each wall of the cubic hybrid is aligned perpendicular to and centered upon the axis of each objective lens. In addition, each wall of the cubic hybrid is set in the focal plane of an objective lens (11) so that the photodetectors mounted thereupon will respond to an accurately selected and accurately focused image of a sector of the panoramic view.

The arrangement of the photodetectors in the focal plane of each objective lens 11 is illustrated in FIGS. 1A, 1C, and 1D. FIG. 1C, in which the walls of the Dewar are broken away to the greatest extent, illustrates two "loose packed" photodetector area arrays 23, one directed toward the foreground and to the left, and the other directed toward the foreground and to the right.

Each "loose packed" array is an area array of photodetectors defining the extent of the useful field of view of the images and extending within the "height" and the "breadth" of the image formed at the focal plane of the lens. Each loose packed array consists of P (e.g. 128) photodetectors per column, the length of the column defining the height dimension of the useful image. The M (e.g. 100) columns per loose packed array, are spaced on Q (e.g. 10) tight-packed pixel intervals between column centers, the dimension spanned defining the breadth dimension of the useful image.

The implications of the foregoing photodetector arrangement for angular resolution are significant. Using the exemplary values earlier suggested, an angular resolution in both elevation angle and in azimuth angle of less than 1 milliradian may be achieved. The 4.7° elevation angle field of view is imaged upon a column of 128 photodetectors giving a "tight packed" vertical resolution of 0.6 milliradians. The 360° field of view in azimuth angle is imaged upon eight loose packed area arrays each having 100 columns. The loose packed array consists of one column of photodetectors for every Q (i.e. 10) photodetector breadths. If, in accordance with the invention, the image is displaced nine times by the breadth of one photodetector, until ten full frame partial image samples are obtained, the completely sampled panoramic image will represent 8000 pixels in azimuth with a resolution of less than 0.80 milliradians. The total angular displacement of the image, as earlier stated, need only be the angular separation between photodetector columns in the object field, and thus 0.45 degrees. Assuming a 5 millisecond frame time for each full frame—partial image sample, a full image sample for the loose pack array may be readout 20 times per second.

Means to spatially scan the image in relation to the photodetector array are provided for each of the eight objective lenses. Such scanning means are illustrated at 24 and 25 in FIGS. 1A and 2A. The control arrangement for scanning and read out is illustrated in FIG. 2A, and the timing is shown in FIG. 2B.

Figure 2B:
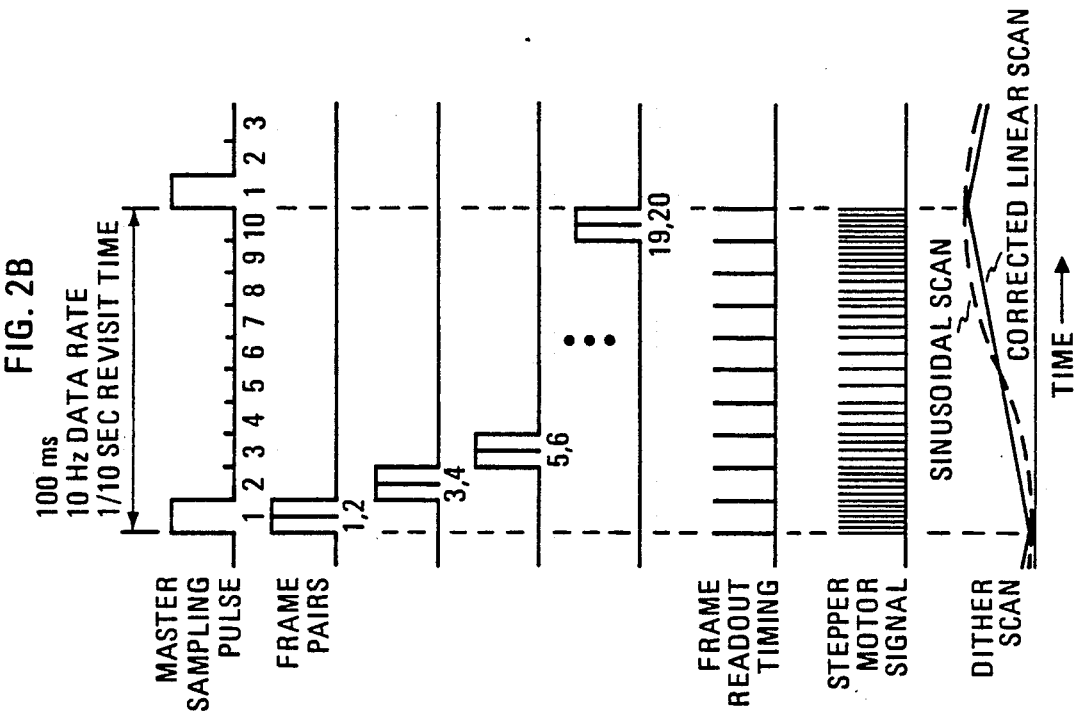
FIGS. 2A and 2B, respectively illustrate means for effecting the dither scanning of the images over the photodetector arrays and the means for control of the dither scanning and readout.
Figure 2A:
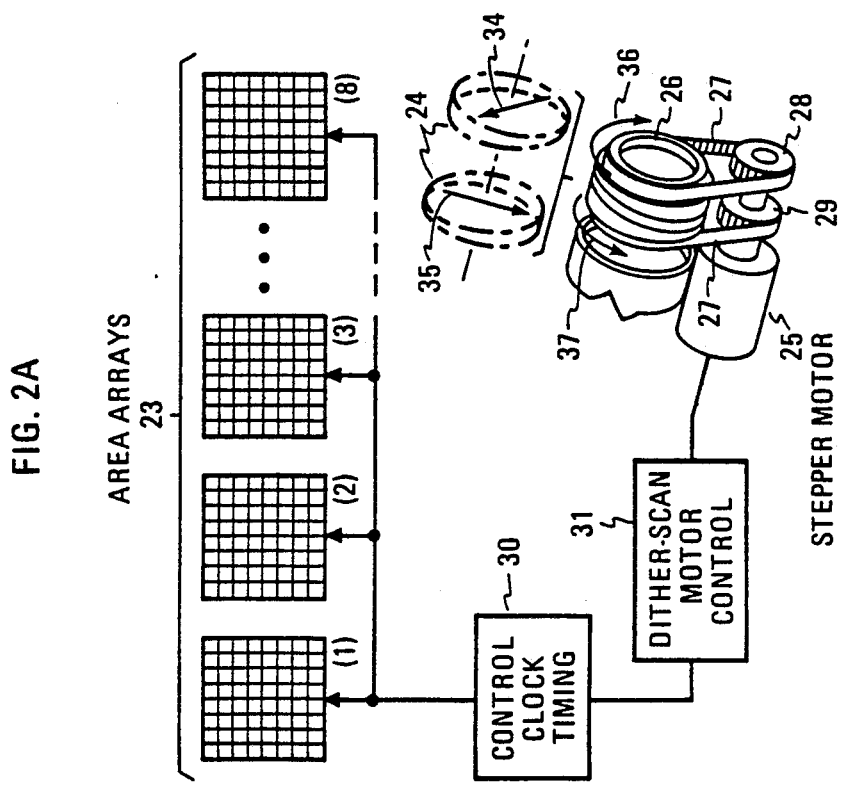

A suitable means for achieving an azimuthal dither scan is shown in FIGS. 1A and 2A. Eight counter-rotating, IR refractive sapphire (or silicon or germanium) wedge pairs 24 of circular aperture are shown, disposed in front of and on the axis of each of the eight objective lenses. The wedge pairs are supported for free rotation in two ball bearing races in a barrel, not illustrated. Each wedge is provided with a hollow gear wheel 26 attached near its perimeter and containing external gear teeth. The arrangement permits indexed rotation of the wedges and a clear view for the objective lenses. Clockwise and counter-clockwise rotation of the wedge pairs 24 at equal rates is effected by means of a geared belt 27 driven by counter-rotating gear shafts 28, 29 on the stepper-motor 25. To achieve the dither scan of all eight of the objective lenses 11, eight wedge pairs are provided, one pair for each lens, and eight stepper-motors 25 are provided, all driven synchronously, one motor for each lens.

The operation of the wedge pairs 24 in performing the dither scan of each image over the associated loose-packed photodetector array 23 may be understood from a consideration of FIGS. 2A and 2B. The slope of each wedge is indicated by the arrows 34, 35. The arrows 34, 35 point away from the thin region toward the thick region, and thus indicate the direction of increasing thickness. By inference, the arrows 34, 35 also indicate the direction of deflection of a ray of IR radiation. Two arrows 36, 37 indicate the oppositely directed senses of rotation of the two wedges.

The slope arrows 34, 35 must maintain horizontal symmetry to limit the resultant ray deflections within a horizontal plane essential to azimuthal scanning ("horizontal" meaning parallel to the horizontal plane of the object field or parallel to the breadth dimension of each array). A suitable initial alignment position is with both arrows 34, 35 pointing to the right in the FIG. 2A illustration. In the initial alignment, a maximum deflection to the right occurs. Equal and oppositely sensed rates of rotation preserve the symmetry of the deflections of the two wedges about a horizontal axis, and cause the resultant deflection to remain within a horizontal plane, reciprocating between plus and minus approximately one fourth of a degree.

Assuming the initial slope alignments described above and exactly equal rates of clockwise and counterclockwise rotation of the two wedges, the following states will result. After one-quarter turn by each wedge from the initial position, the two wedges will have rotated 180° relative to each other, the two arrows will be in opposite directions, and a zero resultant deflection will result. After one-half turn by each wedge from the initial position, the two wedges will have rotated 360° relative to each other, and both arrows will be pointing to the left. In this state, a maximum resultant deflection to the left will result. After three- quarters turn by each wedge, a non-deflected condition will again result, and after one full turn by each wedge a maximum resultant deflection to the right will again result.

The resultant deflection, if not linearized, follows a stepped sinusoidal rule, stepped at the angular rate of the stepper motor 25. When a stepper motor is employed to rotate the wedges 24, the stepper provides a scanning direction proceeding from right to left for one half of the rotational cycle and a scanning direction proceeding from left to right for the other half of the rotational cycle. Assuming 10 dither scanning positions, (Q=10), 10 image positions corresponding to 10 partial samples occur on one slope of the sinusoidal waveform corresponding to one half rotation and 10 positions repeated in reverse order occur on the other slope of the sinusoidal wave form as a full rotation is completed. While the stepper motor advances the wedges in equal step-like angular increments at equal rates, the resultant deflection is stepped in increments which are large near zero deflection, and which are small near maximum deflection where the scanning comes to a halt and reverses in direction. The output utilization circuitry (not illustrated), which accepts the sensory data from the readout circuitry, is programmed to accept a change in scanning direction, but linearization of azimuthal scan is desirable to bring the motion of the scanned image into consistency with the strict periodic nature of the readout.

Ideally, the translation of the image across the photodetector columns would be in 10 instantaneous pixel sized steps. Mechanical arrangements do not ordinarily permit instantaneous steps, and continuous motion approximated by a motor, which is incremented in equal angular steps, small in relation to a pixel, is acceptable. The average angular rotation for a pixel is 360/20=18°, and steps on the order of a few degrees or fractions of a degree are appropriate and produce only a small perturbation of the output of an individual photodetector.

To minimize the non-linearity of a sine wave displacement of the image, which spaces out the samples taken near minimum deflection and crowds the samples taken near maximum deflection, the maximum deflections may be set to exceed the 0.45/2 degrees, so as to operate on the more linear position of the sine wave.

Alternatively, the scanning deflection may be linearized by use of a variable pulse rate in the motor drive waveform or by the use of elliptical gearing. Assuming the former approach, the stepper motor is programmed to take equal sized increments at unequal intervals. Near minimum deflection, the increments occur less frequently to reduce the rate of rotation while near maximum deflection the increments occur more frequently to equalize the spatial distribution of the ten samples over the image. The linearized stepped deflection is illustrated by the bottom waveform of FIG. 2B.

The control of the readout of the eight photodetector arrays 23 and timing of the dither scanning with respect to the readout are illustrated in FIGS. 2A and 2B. The readout of the loose packed area arrays 23 are conventional for area arrays, with the data being reprocessed as necessary for utilization, as noted earlier.

In the FIG. 2A arrangement, the readout of all eight arrays and the dither scanning of each array is controlled by the control block 30. The block 30 supplies the clocking, timing and selection waveforms essential for array operation, and also the timing waveforms required for the dither-scan motor control 31. The array operating waveforms are supplied in parallel to all eight arrays. As illustrated in FIG. 1A, the conductors 38 carry both the array operating waveforms going to each array and the array readout signals derived from each array 23 via one of four connectors 39 supported on the Dewar cover 28.

Suitable array timing is shown in FIG. 2B. The master sampling pulse provided by the control block is the uppermost waveform. It is a rectangular pulse reoccurring once every 100 milliseconds, having a duration of 10 milliseconds, to permit a sequence of 10 sampling pulses of 10 millisecond duration to fill the interval between master pulses.

During the first master sampling pulse, two frames are read out, followed by the readout of two more frames during the next sampling pulse. (Each frame readout requires 5 milliseconds and the pair requires 10 milliseconds). This process continues until all 10 frame readout timing pulses have occurred. Readout of the frames take place as shown in the four waveforms of FIG. 2B provided below the master sampling pulse.

The dither-scan motor control 31 also responds to the master sampling pulses and generates the variable pulse rate drive signal required for the linearized angle scan depicted as the solid line in its lowermost graph of FIG. 2B. The average rate of shaft rotation is 300 RPM.

The foregoing arrangement has a substantial performance advantage over sweeping the image over a single line array. In a conventional azimuthally scanning IRST array, assuming a revisit time of once per second, a one Hertz frame rate, 55μ second integration time is practical. In the present improved arrangement, the revisit time can be 1/10 second with 2 sample frames per position, and with the frame rate set at 200 HZ, a 600μ second integration time is practical. The improved performance results in the revisit time being reduced by a factor of 10, and the integration time being increased 10 fold. At the same time, the use of a dither scan avoids high speed 360° rotations of large parts. The scanning in the present arrangement requires only 300 RPM (average) shaft rotation, which is easily achieved.

FIG. 3 is a schematic view of a second dither scan embodiment, differing from the initial embodiment in that the loose-packed array of the first embodiment is replaced by a slitted cold shield 41, an anamorphic lens 42 and a more conventional tight-packed area array 43. The second embodiment uses eight "tight-packed" area arrays, one on each face of the two cubic hybrid assemblies 19. The area array has 128×128 pixels disposed within overall array dimensions of 0.218"×0.218". The individual pixel areas in an exemplary array are 1.7 mils×1.7 mils (although designs with larger pixels e.g. 3.4×3.4 mils would be equally desirable). The objective lens the optical scanning means 24, 25 are as in the prior embodiment except for a reduction of the dither scan for a Q of 5. For simplicity, the illustration of FIG. 3 is only one of the eight similar systems.

As shown in FIG. 3, a set of 128 vertical slits 44 are set in the cold shield plate 41. The cold shield plate 41 is placed in the focal plane of the objective lens. The slits 44 are spaced over a distance of 1.09" horizontally, 5 times the width of the tight-packed array, and are each 0.218" high, a height equal to the height of the tight-packed array. The 1.7 mil slits are spaced by 0.0085"—five times the width of a 1.7 mil pixel. An anamorphic lens 42 is provided which has a unit vertical magnification, and a horizontal demagnification of 5 to 1. The anamorphic lens 42 is a transfer lens positioned to refocus the light passing through the 128 slits upon the 128 columns of the photodetector array 43.

With proper alignment and a corrected lens 42, the light refocused from each slit is reduced to 1.7 mils in width, fine enough to impinge on a corresponding column of photodetectors. If a reduction different from 5 to 1 is wanted, the foregoing dimensional ratios are correspondingly adjusted. In the plane of the slitted cold shield plate, only every 5th position of the image focused on the cold shield plate is selected and passed through the slits 44. The image is dither-scanned, as in the first embodiment, so that the image is displaced through 5 successive positions, each displacement equal in the focal plane of the objective lens to the width of a slit 44, and in the plane of the array to a pixel breadth.

The FIG. 3 embodiment, with its demagnification by the anamorphic lens has limited optical efficiency. Assuming a fast, F/1.4, objective lens 11, the ray bundle in the focal plane, assuming the object at infinity, subtends approximately 40°. To achieve the highest optical efficiency, a demagnification by 5 in the anamorphic lens requires an angular subtense in the image plane, at the photodetector, in excess of 180° which is impractical. Accordingly, for Q=5, the optical system of FIG. 3, is not able to make efficient use of a lens significantly faster than f/2.

A further embodiment of the invention is depicted in FIGS. 4A and 4B, in which a fan shaped fiber optics assembly is substituted for the anamorphic lens of FIG.

3, and in which the scanning means 24 and the objective lens 11 are as in the first embodiment except for a an increase in the transverse dimensions. The sides of the cubic hybrid assembly are accordingly increased to 4.352", and the diameter of the lenses 11 suitably increased to accommodate the larger image size. The third embodiment also employs a tight-packed array, and does so in a manner that can fully utilize the light gathered from a fast objective lens. A tight-packed 2D photoconductor array of 128×128 pixels, using larger 3.4 mil×3.4 mil pixel sites and having an area of 0.4352"×0.4352" is employed. This larger pixel size permits a larger objective lens for increased system sensitivity. The individual fiber optics occur in 128 column stacks of 128 fibers per stack. The fibers permit a tight-packed configuration at the convergent base of the fan that provides proximity focus, one slit per photoconductor array column. The divergent end of the fan is placed in the focal plane of the objective lens. At the divergent end of the fan, the 128 column stacks are separated on 0.034" centers, such that only every tenth site in the focal plane of the objective lens is occupied as in the first embodiment. Thus, every tenth resolution element of the focused image is sensed, and the dither scan displaces the focused image over the ends of the fibers, so that after ten pixel intervals the entire image has been sampled corresponding to 10×128 consecutive pixel sites in each field as in the first embodiment.

The Fiber optics materials for the third embodiment must be selected to transmit the IR wavelengths of interest. Optical Fibers for 2–11 microns are available from Infrared Fiber Systems, Inc. of Silver Springs, Md. Suitable core material are mixed metal fluroides and chalcogenide (Ge, As, Se) glasses.

The examples described above involve the use of multiple individual dither scanned imagers (N>1), however the invention applies to a single dither scanned imager N=1 as well.

What is claimed is:

1. A dither scanned imaging system providing predetermined elevation angle and azimuth angle coverage of a panoramic field of view referenced to the imaging system axis, said imaging system comprising:
    (1) N objective lenses, each positioned at equal successive azimuth angles about said axis and forming an image of predetermined height and breadth in its image plane of an $N^{th}$ sector shaped portion of said predetermined coverage, height and breadth in the image plane corresponding respectively to elevation angle and azimuth angle, where N is an integral number equal to 1 or more,
    (2) N photodetector area arrays, each disposed in the image plane of said N objective lenses, each array comprising M columns of P photodetectors, the read out of which constitutes a frame, the photodetectors in each column being tightly packed for full spatial sampling of the image of said coverage in height and said M columns being loosely packed in breadth for partial spatial sampling of the image of said coverage per frame, the column centers being spaced by the breadth of Q photodetectors,
    (3) azimuthal scanning means for sequentially displacing each image in relation to the corresponding array in breadth by substantially the breadth of one photodetector, and repeating the displacement (Q−1) times to complete a dithered azimuthal scan for full spatial sampling of the image of said coverage in breadth, and
    (4) means for reading out each array k times at each of said Q positions, where k is an integer, to obtain kQ frames for each completed azimuthal scan,
the arrangement providing P discrete samples of the coverage in elevation angle and (N×M×Q) discrete samples of the coverage in azimuth angle with increased detector integration time, decreased revisit time while requiring only a small azimuthal scanning angle for achieving substantial azimuthal coverage.

2. The imaging system set forth in claim 1, wherein:
said coverage in azimuth angle is 360° and the azimuthal scanning angle is 360/(N×M).

3. The imaging system set forth in claim 2, wherein:
said quantity N=8 and said quantity M is on the order of 100, giving an azimuthal scanning angle on the order of half a degree.

4. The imaging system set forth in claim 1 wherein:
said azimuthal scanning means comprises two counter rotating IR refractive discs of wedge shaped cross section, one arranged for clockwise and the other for counter-clockwise rotation to displace the image only in the breadth dimension.

5. The imaging system set forth in claim 4 wherein:
means are provided for linearizing the displacement of said N images with time during said dither scan.

6. The imaging system set forth in claim 4 wherein:
means are provided for effecting equal, non-uniform rates of rotation of said refractive discs as a function of instaneous image displacement, said rate being slower near zero displacements and faster near maximum magnitude displacements, to linearize the displacement of the image with time during said dither-scan.

7. A dither scanned imaging system providing predetermined elevation angle and azimuth angle coverage of a panoramic field of view referenced to the imaging system axis, said imaging system comprising:
    (1) N objective lenses, each positioned at equal successive azimuth angles about said axis and forming an image of predetermined height and breadth in its image plane of an $N^{th}$ sector shaped portion of said predetermined coverage, height and breadth in the image plane corresponding respectively to elevation angle and azimuth angle,
    (2) N slitted coldshield plates each disposed in the image plane of one of said N objective lenses, each plate having M vertical slits, each slit dimensioned for full spatial sampling of the image of said coverage in height and said M slits being spaced for partial sampling of the image of said coverage per frame, the slit centers being spaced by the breadth of Q slits,
    (3) azimuthal scanning means for sequentially displacing each image relative to the corresponding slitted plate in breadth by substantially the breadth of one slit, and repeating the displacement (Q−1) times to complete a dithered azimuthal scan for full spatial sampling of said image,
    (4) N anamorphic transfer lenses for demagnifying the image at said slits in the vertical plane by a factor of unity, and in the horizontal plane by a factor of Q, and
    (5) N photodetector area arrays, one array disposed in the image plane of each of said N anamorphic transfer lenses, each array comprising M columns of P photodetectors in a tight packed array, the read out of which constitutes a frame, the spatially sampled image on each of said M slits being focused on each of said M columns of photodetectors, and (6) means for reading out each array k times at each of said Q positions, where k is an integer, to obtain kQ frames for each completed azimuthal scan, the arrangement providing P discrete samples of the coverage in elevation angle and $(N \times M \times Q)$ discrete samples of the coverage in azimuth angle with increased detector integration time, decreased revisit time while requiring only a small azimuthal scanning angle for achieving substantial azimuthal coverage.

8. The imaging system set forth in claim 7, wherein: said coverage in azimuth angle is 360° and the azimuthal scanning angle is $360/(N \times M)$.

9. The imaging system set forth in claim 8, wherein: said quantity $N=8$ and said quantity M is on the order of 100, giving an azimuthal scanning angle on the order of half a degree.

10. The imaging system set forth in claim 9 wherein: said azimuthal scanning means comprises two counter rotating IR refractive discs of wedge shaped cross section, one arranged for clockwise and the other for counter-clockwise rotation to displace the image only in the breadth dimension.

11. The imaging system set forth in claim 10 wherein: means are provided for linearizing the displacement of said N images with time during each dither scan.

12. The imaging system set forth in claim 10 wherein: means are provided for effecting equal, non-uniform rates of rotation of said refractive discs as a function of instantaneous image displacement, said rate being slower near zero displacements and faster near maximum magnitude displacements to linearize the displacement of the image with time during each dither-scan.

13. A dither scanned panoramic imaging system providing predetermined elevation angle and azimuth angle coverage of a panoramic field of view referenced to the imaging system axis, said imaging system comprising:

(1) N objective lenses, each positioned at successive azimuth angles about said axis and forming an image of predetermined height and breadth in its image plane of an $N^{th}$ sector shaped portion of said predetermined coverage, height and breadth in the image plane corresponding respectively to elevation angle and azimuth angle, (2) N fan shaped fiber optics assemblies, each assembly consisting of M column stacks of fibers, with P tight-packed fibers per column stack, the divergent end of the assembly being placed in the focal plane of the associated lens with each column stack dimensioned for full spatial sampling of the image of said coverage in height and said M column stacks being spaced for partial sampling of the image of said coverage per frame, the stack centers being spaced by the breadth of Q stacks at the divergent end, and the assemblies being tight-packed, at the convergent end, (3) azimuthal scanning means for sequentially displacing each image relative to the corresponding stack in breadth by substantially the breadth of a stack, and repeating the displacement $(Q-1)$ times to complete a dithered azimuthal scan for full spatial sampling of said image, and (4) N photodetector area arrays, one array disposed in the convergent end of each of said N fiber optics assemblies, each array comprising M columns of P photodetectors in a tight packed array, the read out of which constitutes a frame, the tight-packed fibers at the convergent end of said fiber optics assembly being proximity focused 1 to 1 to the individual photodetectors of said tight-packed array, and (5) means for reading out each array k times at each of said Q positions, where k is an integer, to obtain kQ frames for each completed azimuthal scan, the arrangement providing P discrete samples of the coverage in elevation angle and $(N \times M \times Q)$ discrete samples of the coverage in azimuth angle with increased detector integration time, decreased revisit time while requiring only a small azimuthal scanning angle for achieving substantial azimuthal coverage.

14. The imaging system set forth in claim 13, wherein: said coverage in azimuth angle is 360° and the azimuthal scanning angle is $360/(N \times M)$.

15. The imaging system set forth in claim 14, wherein: said quantity $N=8$ and said quantity M is on the order of 100, giving an azimuthal scanning angle on the order of half a degree.

16. The imaging system set forth in claim 15, wherein: said azimuthal scanning means consists of two counter rotating IR refractive discs of wedge shaped cross section, one arranged for clockwise and the other for counter-clockwise rotation to displace the image only in the breadth dimension.

17. The imaging system set forth in claim 16, wherein: means are provided for linearizing the displacement of said N images with time during each dither scan.

18. The imaging system set forth in claim 16, wherein: means are provided for effecting equal, non-uniform rates of rotation of said refractive discs as a function of instantaneous image displacement, said rate being slower near zero displacements and faster near maximum magnitude displacements, to linearize the displacement of the image with time during each dither scan.

* * * * *